United States Patent [19]

Oetiker

[11] Patent Number: 5,230,126
[45] Date of Patent: Jul. 27, 1993

[54] STEPLESS CLAMP

[75] Inventor: Hans Oetiker, Horgen, Switzerland

[73] Assignee: Hans Oetiker AG Maschinen- und Apparate-fabrik, Horgen, Fed. Rep. of Germany

[21] Appl. No.: 669,860

[22] Filed: Mar. 15, 1991

[51] Int. Cl.⁵ .............................................. F16L 33/02
[52] U.S. Cl. ................................. 24/20 R; 24/20 CW
[58] Field of Search ............ 24/20 R, 20 EE, 20 CW, 24/20 TT, 23 W, 30.5 W

[56] References Cited

U.S. PATENT DOCUMENTS

| | | | |
|---|---|---|---|
| 421,598 | 2/1890 | Monto | 87/312 |
| 2,063,167 | 12/1936 | Kamborian | 81/311 X |
| 4,299,612 | 11/1981 | Oetiker | 24/20 CW X |
| 4,907,319 | 3/1990 | Calmettes et al. | 24/20 CW X |

FOREIGN PATENT DOCUMENTS

| | | |
|---|---|---|
| 869584 | 3/1953 | Fed. Rep. of Germany ... 24/20 CW |
| 1064048 | 4/1967 | United Kingdom . |

Primary Examiner—James R. Brittain
Attorney, Agent, or Firm—Paul M. Craig

[57] ABSTRACT

A clamp structure which is provided with at least one pair of plastically deformable ear-like folds located on opposite sides of a center longitudinal cut in the clamping band and spaced in the circumferential direction by such a distance that they can be plastically deformed simultaneously by the use of a pincer-like tool. The pincer-like tool includes two sets of jaw-like members spaced from one another so as to permit simultaneous engagement of the two ear-like folds of a respective pair. The pincer-like tool may thereby have a relatively fixed center member forming a relatively fixed jaw-like member and two pivotally supported jaw-like members operable to be actuated toward one another. In the alternative, the pincer-like tool may include two sets of jaw-like members pivotally connected with each other whose points of pivotal connection are coupled with each other as also corresponding jaw-like members to assure movement in unison. By simultaneously plastically deforming the two ear-like folds while maintaining their relative position in the circumferential direction, a clamp structure can be realized devoid of any gaps, discontinuities or steps that might otherwise be a source of leakage.

13 Claims, 2 Drawing Sheets

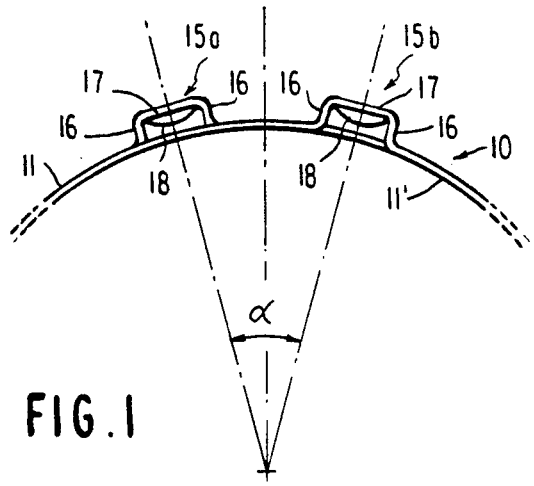
FIG.1
FIG.2
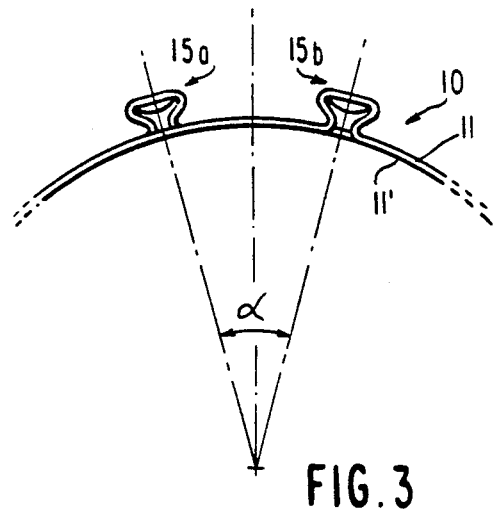
FIG.3
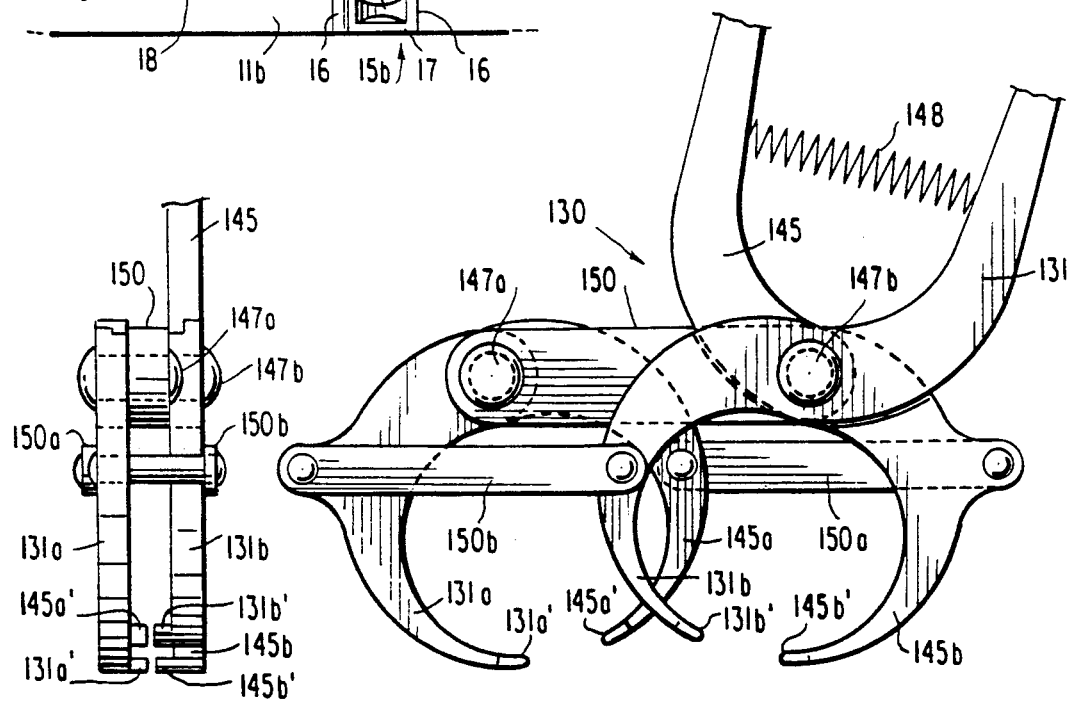
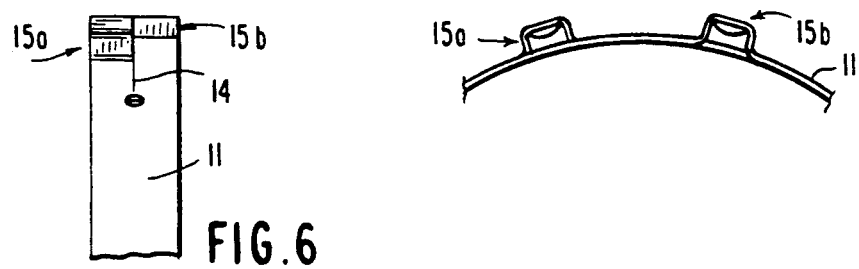
FIG.5
FIG.6

STEPLESS CLAMP

FIELD OF INVENTION

The present invention relates to a clamp structure, particularly to a hose clamp, whose internal clamping surface is devoid of any step or discontinuity.

BACKGROUND OF THE INVENTION

Hose clamps made from tubular stock with one or more plastically deformable, so-called "Oetiker" ears, as disclosed in my prior U.S. Patents 2,614,304 and 3,082,498 have been used with great success for more than three decades. In order to bridge the gap which remains underneath the "Oetiker" ear after contraction thereof, insert rings as disclosed in my prior U.S. Pat. No. 3,303,669 or insert members as disclosed in my prior U.S. Pat. No. 3,789,463 have been used. Such insert members were also used with open clamps mechanically interconnected at overlapping band end portions, as disclosed in FIG. 12 of my prior U.S. Pat. No. 4,315,348. Though these insert rings, respectively, insert members also proved quite successful, they entailed the disadvantage of increased costs in manufacture and assembly and additionally exhibited steps in the areas of overlap with the clamping band. These steps were of lesser significance with the relatively soft hose materials made from rubber or rubber-like materials as used heretofore. However, with the advent of plastic, relatively thin hose materials having a high degree of hardness, however, even slight steps with the use of relatively thin band material for the insert rings or insert members represent a possible source of leakage.

My prior U.S. Pat. No. 3,286,314 in which the open band ends were connected with each other by a special type of riveted connection, proposed to bridge the gap underneath the so-called "Oetiker" ear by a continuation of the inner band end, terminating ahead of a step in the outer band portion. However, a discontinuity still existed at the end of the inner band portion. The German Gebrauchsmuster (DE-GM) 75 41 277.0 suggested for an open clamp with a riveted or welded connection of the overlapping band ends, a tongue-like extension in the inner band portion commencing within the area of the welded connection and engaging into a pressed-out groove in the outer band portion beginning directly at the leg of the ear opposite the welded connection. In addition to other drawbacks, the clamp disclosed in this German Gebrauchsmuster entailed the significant disadvantage that the gap underneath the ear was bridged by an only narrow tongue-like extension that offered limited resistance to outward deflection into the gap underneath the ear in the presence of temperature and/or pressure fluctuations.

To provide a completely satisfactory internal clamping surface devoid of any gap, discontinuity or step over the entire circumference of the clamp, clamp structures are disclosed in my prior U.S. Pat. Nos. 4,299,012 and 4,315,348 in which the end of an overlapped inner band portion is provided with a tongue-like extension adapted to engage in a tongue-receiving means provided in the outer band portion and commencing at a step. The tongue-receiving means may thereby be in the shape of a central pressed-out channel beginning at a first step-like portion which brings the remaining lateral band portions to the radial height of the channel and terminating in a second step-like portion located in a direction away from the ear-like structure or other tightening means. In the alternative, the tongue-receiving means is constituted by an aperture commencing within the area of the step-like portion and extending a certain distance in the circumferential direction away from the ear-like structure or other tightening means. Clamp structures utilizing the inventions of the two last-mentioned patents have proved immensely commercially successful. However, in case of clamp structures made from tubular endless stock, they still require an insert member underneath the ear, though such insert member may be provided with tongue-like extensions engaging in tongue-receiving means as described in these two last-mentioned patents.

The British Patent 1,064,048 discloses a clamp, intended to provide a continuous circle for surrounding a flexible tube to avoid an interruption which could result in squeezing out and pinching the tube during tightening. To that end, this patent suggested in one embodiment the use of a double ring formation for the main loop consisting of two superimposed convolutions of similar diameter made as a helical winding from a single length of wire with the loops provided at diametrically opposite ends with tightening loops. In another embodiment of this patent, the double ring formation for the main loop is made from two separate and similar members each including a main loop superimposed one on the other and welded together in such a manner that the tightening loops are disposed opposite one another. Apart from cost considerations, the clamp of this patent also entails drawbacks from an installation point of view, not to mention the fact that the two loops made of wire-like material do not offer a substantially flat internal clamping surface. Moreover, another serious drawback of the clamp disclosed in this patent resides in the fact that the two tightening loops cannot be closed at the same time with one and the same tool.

The European Patent 0 296 918 discloses an open clamp in which the overlapping band portions are mechanically connected by a hook and anchoring arrangement unable to provide any elastic yielding to compensate for changes in temperature and pressure as assured by so-called "Oetiker" ears. To impart some elastic compensating capability to the clamp disclosed in this patent, the patent proposes the use of tensional spring elements which are located on opposite sides of a longitudinal cut in the center of the band and spaced from each other in the circumferential direction. The arrangement described in this European patent is to assure that the tightening continuity be maintained over the entire periphery of a soft tube regardless of the deformation of the undulations represented by the tensional spring elements, owing to their spaced circumferential spacing on the two sides of the longitudinal cut in the band. However, this patent does not deal with those problems peculiar to clamps provided with plastically deformable "Oetiker" ears in which the gap underneath the ear that itself assures an elastic compensation for temperature and/or pressure changes, must be bridged in such a manner as to avoid a gap, discontinuity or step, and at the same time offer such a resistance as to preclude the hose from being squeezed into the remaining gap. Such resistance can be assured only by the full band width bridging the gap underneath the ear.

SUMMARY OF THE INVENTION

It is a principal object of the present invention to provide a clamp structure provided with a plastically deformable so-called "Oetiker" ear which avoids the aforementioned shortcomings and drawbacks in a simple manner without any significant additional costs in manufacture and which can be installed in a simple and efficient manner.

The underlying problems are solved according to the present invention in that the clamping band is provided with a centrally located cut extending over a part of the circumference of the clamp structure and with at least one pair of plastically deformable ears spaced in the circumferential direction and located on opposite sides of the longitudinal cut which are so spaced that they can be contracted simultaneously, preferably with the use of a single tool. This allows easy installation of a clamp structure made from tubular stock without the need of any insert members to bridge the gap underneath the ear yet permits excellent holding ability of the clamp over its entire circumference devoid of any gaps, discontinuities or steps along the internal clamping surface.

If two pairs of such ear-like structures located on opposite sides of two partial circumferential cuts and spaced circumferentially from each other are used which are disposed 180° opposite one another, a completely balanced clamp structure is realizable devoid of any gap, discontinuity or step along the internal clamping surface without the need for any insert members or the like.

Though the present invention is particularly applicable to clamp structures made from tubular stock, it also offers significant advantages with open clamp structures whose overlapping ends are mechanically interconnected. In order to cover the gap underneath the ear, the mechanical interconnection as well as the means to obtain a stepless configuration by the use of a tongue-like extension and a tongue-receiving means, as disclosed in my aforementioned U.S. Pat. Nos. 4,299,012 and 4,315,348, are normally located in the clamp structure within the circumferential half thereof including the plastically deformable ear. This aggravates the existing unbalance of the installed clamp.

According to another feature of the present invention, however, it is possible to provide an open clamp structure which is balanced by locating the mechanical connection and the means for providing a stepless internal configuration opposite the pair or pairs of plastically deformable ears so that the clamp structure is automatically balanced without the need of further measures or can be balanced, if needed, by the use of one or more openings which can be readily punched out during manufacture of the blank.

Multiple advantages are realizable with the present invention. Insofar as endless clamps made from tubular stock are concerned, the gap underneath the plastically deformable ear no longer poses a problem. Moreover, such endless clamps can now be manufactured so as to be perfectly balanced without the need for any insert members or the like to bridge the gap underneath the ear.

Insofar as pen clamp structures are concerned with one or more plastically deformable ears, the present invention offers greater latitude in the location of the overlapping band ends to provide a balanced clamp structure without the need for any additional insert members or the like to bridge the gap underneath a plastically deformable ear.

According to one embodiment of the present invention, a tightening tool of pincer-like construction is provided which includes a relatively fixed jaw-like member extending over the full band width and of an effective thickness in the circumferential direction corresponding at least approximately to the spacing between the ears of a corresponding pair of ears. The pincer-like tool further includes two further relatively movable jaw-like members movable (pivotal)in mutually opposite directions toward the relatively fixed jaw-like member with the two further jaw-like members being each of a width preferably less than the width of the fixed member and disposed on opposite sides of a center plane through the fixed jaw-like member.

In another embodiment of a tool permitting simultaneous closing of a pair of plastically deformable ears, the tool consists of two pivotally connected pincer-like parts so mechanically linked with each other that corresponding jaw-like members of the two pincer-like parts move in the same direction and by equal amounts.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a partial elevational view of a clamp structure with a pair of ear-like folds in accordance with the present invention in the non-contracted condition;

FIG. 2 is top plan view on the clamp structure of FIG. 1;

FIG. 3 is an axial elevational view, similar to FIG. 1, illustrating the clamp structure with the ear-like folds in the contracted condition;

FIG. 5 is a somewhat schematic elevational view of a modified embodiment of a pincer-like tool for contracting the ear-like folds of a clamp structure in accordance with the present invention;

FIG. 6 is a side elevational view of the pincer-like tool of FIG. 5;

DETAILED DESCRIPTION OF THE DRAWINGS

Figure 4:
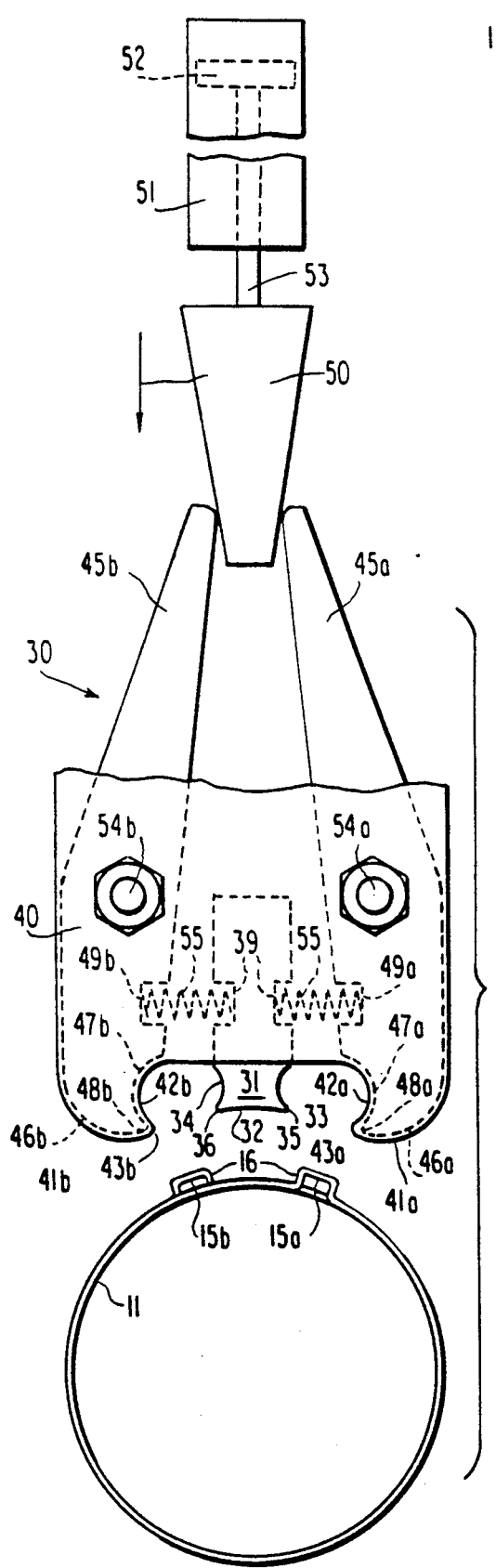
FIG. 4 is a somewhat schematic, partly broken away elevational view of a pincer-like tool for use with a clamp structure in accordance with the present invention.

Referring now to the drawing wherein like reference numerals are used throughout the various views to designate like parts, and more particularly to FIGS. 1 and 2, reference numeral 10 generally designates a clamp structure including a clamping band 11 and one pair of ear-like folds generally designated by reference numerals 15a and 15b, each of which consists of two generally outwardly extending leg portions 16 interconnected by a bridging portion 17. The bridging portion 17 is thereby preferably provided with a reinforcing means 18 which may be in the form of a longitudinally extending groove, in the shape resembling a canoe as viewed in top plan view and of the type disclosed in my prior U.S. Pat. No. 3,475,793. However, the reinforcing means 18 is preferably of the type disclosed in my copending application Ser. No. 06/922,408, filed Oct. 23, 1986 and entitled "Deformable Ear For Clamps," the subject matter of which is incorporated herein by reference. The corresponding British application has already issued as British Patent 2,160,577. According to the aforementioned copending application, the reinforcing means is in the form of a shallow, generally pan-shaped depression which is substantially rectangular as viewed in top plan view with the sides of the rectangle extending at least over half the corresponding dimension of the bridging portion 17. The bottom of the shallow reinforcing depression may thereby be relatively flat or may be concavely shaped with a relatively large radius of curvature as shown in FIGS. 1 and 2. According to the present invention, a cut 14 is provided in the clamping band 11 which is located in the central longitudinal plane of the clamping band and extend over a predetermined distance in the circumferential direction. The ear-shaped folds 15a and 15b are thereby located on opposite sides of the cut 14 and are spaced a predetermined circumferential distance from one another defined by the angle $\alpha$, which subtends an angle extending through the center of the bridging portion 17 of one ear-like fold to the center of bridging portion 17 of the other ear-like fold. The ear-like folds 15a and 15b thereby have a width in a direction transverse to the longitudinal direction of the clamping band 11 which is equal to the width of the corresponding portion of the clamping band located on the same side with respect to the cut 14, i.e., have a width one-half the full clamping band width if the cut 14 is located exactly in the center longitudinal plane. Upon contraction of the ear-like folds 15a and 15b by an appropriate tool of any known construction, preferred embodiments of which will be described hereinafter, which will maintain the angle constant, the inner clamping surface 11' of the clamp structure 10 which will result from this particular arrangement of the ear-like folds 15a and 15b will be devoid of any gaps, discontinuities or steps. Even though a gap may continue to exist underneath a given ear-like fold upon contraction thereof, the gap is rendered in effect inconsequential because within the area of any such remaining gap, one-half of the clamping band on the side of the cut opposite this ear-like fold remains uninterrupted. The present invention thus permits the realization of a clamp-like structure with plastically deformable ears whose remaining gaps cannot become the source of leakage.

If FIG. 1 involves an endless clamp structure, i.e., made from tubular stock, then the advantages of the plastically deformable "Oetiker"-type ear-like folds, i.e., their ability to automatically compensate for changes in temperature and/or pressure and/or in the hose material, is completely preserved and at the same time, the internal clamping surface is effectively without gap, discontinuity or step without the need of any other measures or parts, such as insert members.

The ear-like folds 15a and 15b are thereby located at such a circumferential distance from one another that they can be closed simultaneously so as to preserve the angle $\alpha$.

FIG. 4 schematically illustrates one embodiment of a pneumatic pincer-like tool for plastically deforming the ear-like folds 15a and 15b simultaneously while assuring at the same time that the angle $\alpha$ (FIGS. 1 and 3) remains constant. The pincer-like tool generally designated by reference numeral 30 of FIG. 4 includes a housing 40, shown partly broken away whose tool-engaging end is provided with convexly shaped portions 41a and 41b passing over into concavely shaped surfaces 42a and 42b of a smaller radius of curvature than the portions 41a and 41b, by way of more or less pointed tip portions 43a and 43b. Fixedly connected by any known means with the housing 40 is a relatively fixed center member 31 having a width in a direction perpendicular to the plane of the drawing corresponding substantially to the clamping band width. The relatively fixed center member 31 is provided with a concavely shaped end surface 32 conforming generally to the curvature of the clamp structure and with two concavely shaped side surfaces 33 and 34 which, together with the end surface 32 form more or less sharp fold-engaging surfaces 35 and 36 adapted to engage with these leg portion 16 of the ear-like folds 15a and 15b which are disposed facing one another as shown in FIG. 4. The pincer-like tool 30 of FIG. 4 includes two jaw-like members 45a and 45b pivotally mounted about bolts 54a and 54b which hold together oppositely disposed sides of the housing 40 defining therebetween the space accommodating the jaw-like members 45a and 45b for pivotal movement. The shape of the jaw-like members 45a and 45b thereby conforms substantially to the shape of the housing portions 41a, 42a, 43a and 41b, 42b, 43b, i.e., are provided with convexly shaped surfaces 46a and 46b as well as with concavely shaped surfaces 47a and 47b defining therebetween the ear-like fold-engaging tip portions 48a and 48b. For purposes of closing the jaw-like members 45a and 45b, the actuating mechanism shown only schematically includes a truncated conical wedging member 50 connected by way of a piston rod 53 with the piston 52 in a cylinder 51 which may be a fluid-actuated, preferably pneumatically actuated piston cylinder unit whereby admission of the pressure medium on the bottom side of cylinder 51 causes the tips 48a and 48b of the jaw-like members 45a and 45b to engage with oppositely disposed legs of the ear-like folds 15a and 15b to plastically deform the same into the configuration shown in FIG. 3. The jaw-like members 45a and 45b thereby need not extend over the full width of the clamping band but may be of approximately half the clamping band width though located on opposite sides relative to the center of the fixed member 31. To keep the jaw-like members 45a and 45b in the normally open position, springs 55 may be provided which engage in recesses 39 provided in the center member 31 and in recesses 49a and 49b provided in the jaw-like members 45a and 45b. The pincer-like tool shown in FIG. 4 thus permits simultaneous plastic deformation of a pair of ear-like folds of the type shown in FIG. 1 into the closed condition shown in FIG. 3. This in turn entails the advantage that no forces or stresses occur in the clamping band itself during plastic deformation of the ear-like folds owing to the simultaneous closing of the ear-like folds by means of a tool which maintains the angle $\alpha$ constant, so that the clamping band will not buckle or deform.

FIGS. 5 and 6 illustrate schematically a modified embodiment of a pincer-like tool for closing the ear-like folds 15a and 15b in such a manner that the angle $\alpha$ remains also constant. FIGS. 5 and 6 thereby illustrate a pincer-like tool which offers somewhat greater latitude in the circumferential spacing of the ear-like folds, includes actuating handle portions 131 and 145 each terminating in a jaw-like member 131b and 145b whereby the two handle portions 145 and 131 are pivotally interconnected with one another by way of a pivot shaft 147b. As is quite apparent, the handle portions 131 and 145 which are normally kept apart by a light compression spring 148 only schematically shown will close the jaw-like members 131b and 145b when being pressed together, as is usual for such pincer-like tools. A second pair of similar pincer-type jaw-like members 131a and 145a are provided which are pivotally interconnected about the pivot shaft 147a spaced a certain distance from pivot shaft 147b. Furthermore, to assure movement in unison between corresponding jaw-like members, the jaw-like members 131a and 131b are pivotally connected with each other by way of a coupling link 150b, and the jaw-like members 145b and 145a are also pivotally interconnected by way of a coupling link 150a. The jaw-like members 145b and 131b are thereby so constructed and arranged as to be able to plastically deform the ear-like fold 15b while the jaw-like members 131a and 145a are located on the opposite side of the cut 14 for closing the ear-like fold 15a. The width of the fold-engaging tips 131a', 145a' and 131b', 145b' and their location in a plane perpendicular to the drawing are so chosen as to avoid any possible interference.

The tool illustrated in FIGS. 5 and 6 also assures constancy of the angle α combined with simultaneous plastic deformation of the ear-like folds 15a and 15b.

Figure 7:
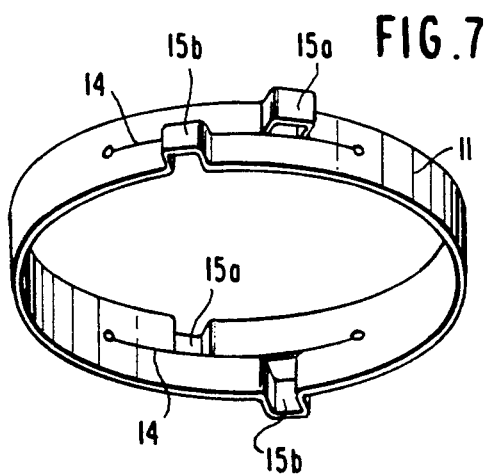
FIG. 7 is a modified embodiment of a clamp structure in accordance with the present invention, similar to FIG. 1, but provided with two pairs of oppositely disposed ear-like folds to provide a balanced clamp structure.

FIG. 7 illustrates an endless clamp structure made from tubular stock which is provided with two oppositely disposed pairs of ear-like folds 15a and 15b located in the clamping band mutually opposite by 180°. As can be seen from FIG. 7, ear-like folds 15a of the two pairs are disposed 180° relative to one another in the clamping band 11 on the same side of the cuts 14 while ear-like folds 15b are disposed mutually opposite by 180° on the other side of the cuts 14. This particular arrangement permits automatic realization of a fully balanced clamp structure with a clamping surface devoid of any gaps, discontinuities or steps.

Figure 9:
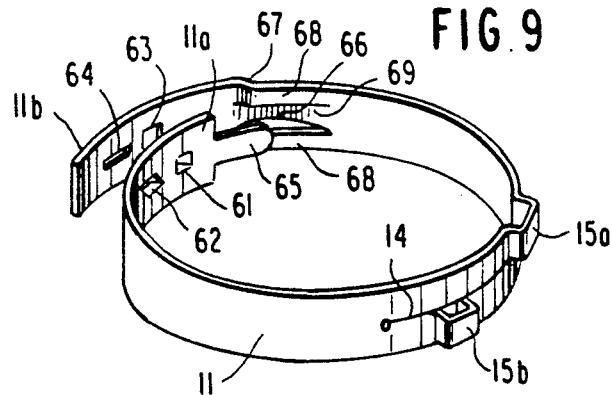
FIG. 9 is a perspective view of the open clamp structure of FIG. 8.
Figure 8:
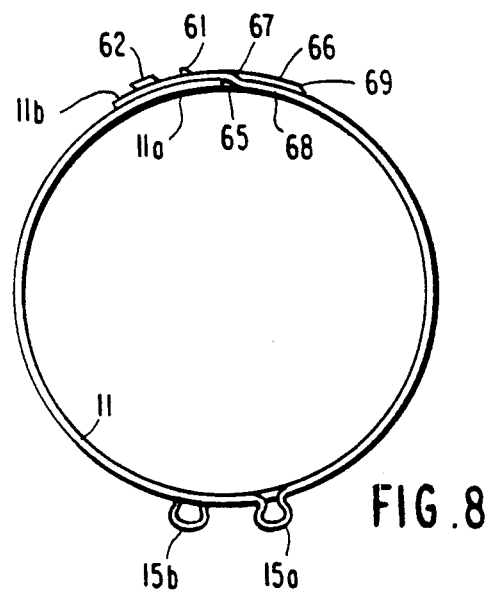
FIG. 8 is an axial elevational view of an open clamp structure provided with a pair of ear-like folds in accordance with the present invention.

FIGS. 8 and 9 illustrate the application of the present invention to an open clamp structure whose overlapping band portions are mechanically interconnected. The ear-like folds 15a and 15b are again located on opposite sides of the center longitudinal cut 14 and preferably opposite the overlapping band ends with their mechanical interconnection so that a balanced clamp structure can be realized without any further measures.

The mechanical interconnection thereby includes one or more support hooks with either a guide hook or a combined guide and support hook as shown in my prior U.S. Pat. Nos. 4,299,012 and 4,622,720, whereby the hooks extend outwardly from the inner band portion and engage in corresponding apertures in the outer overlapping band portion. In the illustrated embodiment, one cold-deformed support hook 61 and one combined guide and support hook 62 which are pressed-out from the inner band end portion 11a as described in my prior U.S. Pat. No. 4,622,720, engage in corresponding apertures 63 and 64 provided in the outer band portion 11b. To assure a stepless configuration of the inner clamping band surface also within the area of the mechanical connection where the inner and outer band end portions 11a and 11b overlap, a tongue-like extension 65 is provided at the free end of the inner band portion which is adapted to engage in a tongue-receiving means, shown in FIG. 9 as a pressed-out centrally located channel 66 commencing within the area of a step-like portion 67 which brings the remaining lateral band portions 68 to the radial height of the channel-shaped depression 66. The channel-shaped depression 66 thereby extends from the first step-like portion 67 away from the mechanical interconnection up to a second step-like portion 69. However, in lieu of the channel-shaped depression 69 of the tongue-receiving means 66, 67, 68 and 69, the tongue-receiving means may also be constructed as an aperture commencing within the area of the first step-like portion 67 and extending away from the area of the mechanical connection a predetermined distance in the circumferential direction, as also disclosed in my prior U.S. Pats. 4,299,012 and 4,315,348. In order to achieve high tightening forces, it is preferable if the two pairs of ear-like folds 15a and 15b be plastically deformed at the same time with the use of two pairs of pincer-like tools, as disclosed, and applied at the same time on opposite sides of the clamp structure.

The advantage of the open clamp structure illustrated in FIGS. 8 and 9 over, for example, the clamp structure illustrated in FIGS. 7 or 19 of my prior U.S. Pat. No. 4,299,012 resides in the fact that the mechanical connection need no longer be located within the area of the ear-like fold in order to bridge the gap underneath the ar-like fold by the full band width of the inner band portion terminating in the tongue-like extension adapted to engage in the tongue-receiving means, but instead the mechanical connection as well as the means to provide a stepless internal clamping surface can now be located opposite the ear-like structure consisting of one or more pairs of ear-like folds in accordance with the present invention so that a balanced clamp structure can be attained without any further measures. In other words, the extra clamping band material within the area of the ear-like folds can now be compensated by the overlapping band end portions provided with the mechanical interconnection and the means for obtaining the stepless configuration. If needed, it is, of course, also possible to provide one or more additional small cut-outs in the clamping band within predetermined areas of the clamping band to achieve a perfect balance.

While I have shown and described only several embodiments in accordance with the present invention, it is understood that the same is not limited thereto but is susceptible of numerous changes and modifications as known to those skilled in the art. For example, the mechanical interconnection may be achieved by any known means, for example, by a riveted joint as disclosed in my prior U.S. Pat. No. 3,218,314. The Clamping band may be flat or may have laterally bent-up edges so as to minimize the danger of damaging the hose. Additionally, the pressed-out tongue-receiving channel may be separated from the remaining lateral band portions by one or several cuts on each side thereof in order to avoid an excessive stiffening of the clamping band within the area of the channel. Thus, the present invention is susceptible of numerous changes and modifications as known to those skilled in the art, and I therefore do not wish to be limited to the details shown and described herein but intend to be limited only by the scope of the appended claims.

I claim:

1. A clamp structure, comprising clamping band means and plastically deformable ear-like means having generally outwardly extending, substantially rectilinear leg portions forming tool-engaging surfaces and operable to tighten the clamp structure about an object to be fastened upon contraction of the ear-like means by plastic deformation thereof, characterized in that the clamping band means is provided with an at least approximately centrally disposed cut extending over a part of the circumference of the clamping band means, and in that the plastically deformable ear-like means include at least one pair of plastically deformable ear-like fold means located on opposite sides of the cut and spaced a predetermined distance from one another in the circumferential direction with each ear-like fold means having a width in a direction transverse to the circumferential direction of the clamping band means corresponding substantially to the width of the part of the clamping band means located on the corresponding side of the cut, said ear-like fold means of a circumferentially adjacent pair on opposite sides of the cut being so spaced as to be operable to be contracted substantially simultaneously.

2. A clamp structure according to claim 1, characterized in that each ear-like fold means includes two circumferentially spaced, outwardly extending leg portions interconnected by a bridging portion, and in that the bridging portion is provided with reinforcing means.

3. A clamp structure according to claim 2, characterized in that the reinforcing means is formed by a relatively shallow, generally pan-shaped depression of at least approximately rectangular shape as viewed in plan view with the sides of the rectangle extending over more than half the corresponding dimension of the bridging portion.

4. A clamp structure according to claim 1, characterized in that two pairs of ear-like fold means are provided in the clamping band means which are located substantially opposite one another so that the clamp structure is automatically balanced, yet provides an internal clamping surface devoid of any gaps, discontinuities or steps without any further measure.

5. A clamp structure according to claim 4, characterized in that corresponding ear-like fold means of the two pairs are located on corresponding sides of the respective cut, and mutually displaced by 180° on the same side of the cut.

6. A clamp structure according to claim 5, characterized in that the clamp structure is made from tubular stock so that the endless internal clamping surface is devoid of any gap, discontinuity or step along the entire clamping surface.

7. A clamp structure according to claim 1, characterized in that the clamp structure is made from tubular stock so that the endless internal clamping surface is devoid of any gap, discontinuity or step along the entire clamping surface.

8. A clamp structure of the open type having overlapping band portions mechanically interconnected by connecting means according to claim 1, characterized in that the mechanical connecting means are located in the overlapping band portions substantially opposite the pair of ear-like fold means.

9. A clamp structure according to claim 8, characterized in that the mechanical connecting means are so constructed and located in the clamping band means that they will provide a balanced clamp structure in the installed condition.

10. A clamp structure according to claim 8, characterized by means in the area of the overlapping band portions to provide a substantially stepless internal clamping surface including a tongue-like extension at the free end of the inner band portions operable to engage in a tongue-receiving means in the outer band portion which commences within the area of an outwardly directed step-like portion in the outer band portion.

11. A clamp structure according to claim 10, characterized in that the tongue-receiving means is formed by an aperture means commencing within the area of the step-like portion and extending away from the area of the mechanical connecting means.

12. A clamp structure according to claim 10, characterized in that the tongue-receiving means is formed by a pressed-out central channel in the outer band portion commencing at the first-mentioned step-like portion which raises the lateral remaining band portions substantially to the height of the pressed-out channel and terminating in a second step-like portion located in the clamping band means at a predetermined distance from the first step-like portion in a direction opposite the area of the mechanical connecting means.

13. A clamp structure according to claim 10, characterized in that the mechanical connecting means are so constructed and located in the clamping band means that they will provide a balanced clamp structure in the installed condition.

* * * * *